United States Patent [19]

Arima et al.

[11] Patent Number: 4,607,539
[45] Date of Patent: Aug. 26, 1986

[54] STEERING WHEEL ASSEMBLY WITH NON-ROTATABLE CENTER HUB

[75] Inventors: Sumitsugu Arima, Yokosuka; Hiroshi Tsuda; Hideyuki Nagashima, both of Yokohama, all of Japan

[73] Assignee: Nissan Motor Co., Ltd., Yokohama, Japan

[21] Appl. No.: 640,138

[22] Filed: Aug. 13, 1984

[30] Foreign Application Priority Data

Aug. 17, 1983 [JP] Japan .............. 58-126937[U]

[51] Int. Cl.$^4$ .................. B62D 1/04; B62D 1/16
[52] U.S. Cl. .................. 74/492; 74/484 R; 74/552; 180/78; 200/61.54; 411/353; 411/517
[58] Field of Search .............. 74/484 R, 552, 492; 180/78; 200/61.54; 411/352, 353, 517, 518, 519; 403/259, 326

[56] References Cited

U.S. PATENT DOCUMENTS

| | | | |
|---|---|---|---|
| 2,552,166 | 5/1951 | Gardiner | 411/518 X |
| 2,595,787 | 5/1952 | Heimann | 411/518 X |
| 4,409,584 | 10/1983 | Arima et al. | 74/484 R |
| 4,485,371 | 11/1984 | Yamada et al. | 200/61.54 X |

FOREIGN PATENT DOCUMENTS

| | | | |
|---|---|---|---|
| 49-17167 | 4/1974 | Japan | 74/484 R |
| 57-110542 | 7/1982 | Japan | 180/78 |
| 57-163448 | 10/1982 | Japan | . |

Primary Examiner—Allan D. Herrmann
Attorney, Agent, or Firm—Schwartz, Jeffery, Schwaab, Mack, Blumenthal & Evans

[57] ABSTRACT

In order to support an annular member, to which the non-rotatable center hub is connected, on a tubular holder without permitting an axial play of the annular member relative to the tubular holder, an improved measure is disclosed which comprises an annular groove formed about the tubular holder, the rounded bottom surface of the annular groove being tapered toward the major portion of the tubular holder, and a snap ring coaxially disposed in the annular groove with its inner wall contacting with the tapered bottom surface of the annular groove and its inboard side surface slidably contacting with an axial end surface of the annular member.

7 Claims, 8 Drawing Figures

FIG.2
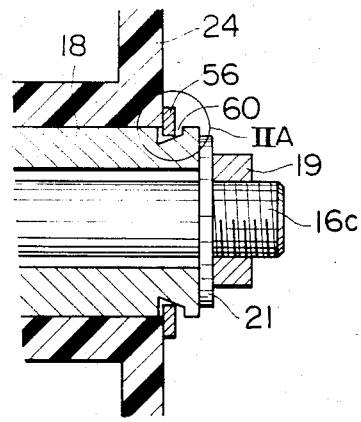
FIG.2A
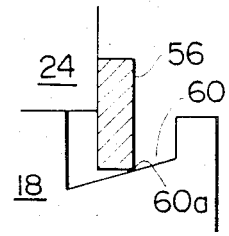
FIG.2B
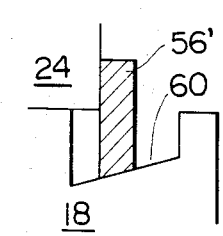
FIG.2C
FIG.3 (PRIOR ART)
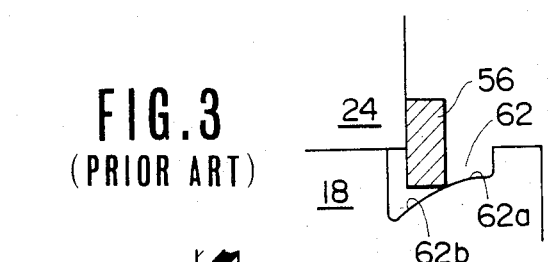
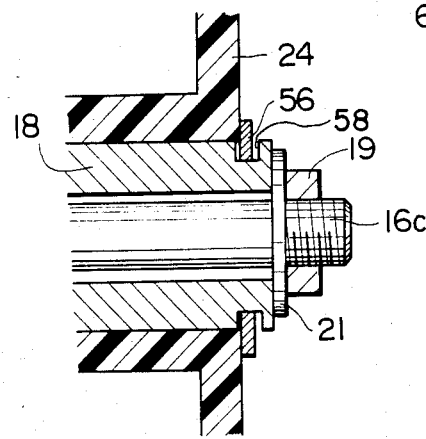
FIG.4
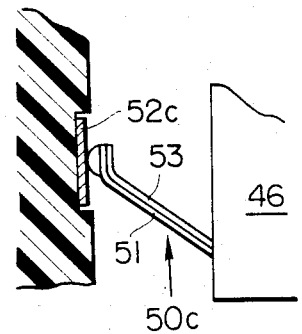

STEERING WHEEL ASSEMBLY WITH NON-ROTATABLE CENTER HUB

BACKGROUND OF THE INVENTION

1. Field of the Invention

The present invention relates in general to a steering wheel of a motor vehicle, and more particularly to a steering wheel assembly having a non-rotatable center hub.

2. Description of the Prior Art

Some of the modernized motor vehicles are equipped with a steering wheel assembly which has at its center portion a non-rotatable center hub serving as a so-called sub-instrument panel. That is, in such assembly, the center hub is kept in its fixed non-rotatable position even when the steering wheel is rotated. Because of easiness with which manipulation is carried out, horn switch, radio switches (such as ON-OFF switch, tuning switch, volume switch or the like) and automatic speed control switch, etc., are usually mounted on such non-rotatable center hub. However, for some reasons, some of the hitherto proposed steering wheel assemblies of the above-mentioned type have suffered from a considerable play of the center hub particularly after long use of it, which play tends to produce an annoying vibration or noise during cruising of the vehicle. Of course, such phenomena cause the driver or passengers to feel uncomfortable.

SUMMARY OF THE INVENTION

It is therefore an essential object of the present invention to provide a steering wheel assembly having a non-rotatable center hub, which is free of the above-mentioned drawback.

According to the present invention, there is provided a steering wheel assembly with a non-rotatable center hub, which comprises a steering shaft to which a steering wheel is connected to rotate therewith, a tubular holder concentrically disposed on the steering shaft and secured thereto to rotate therewith, an annular member concentrically disposed about the tubular holder and rotatable relative thereto, the annular member carrying thereon the non-rotatable center hub, first means for restricting the axial movement of the annular member in one direction relative to the tubular holder, second means for restricting the axial movement of the annular member in the other direction relative to the tubular holder and third means for holding the annular member stationary relative to the tubular holder even when the steering shaft and thus the tubular holder are rotated, wherein one of the first and second means comprises an annular groove formed about the tubular holder, the rounded bottom surface of the annular groove being tapered toward the other of the first and second means, and a snap ring concentrically disposed in the annular groove with its inner wall contacting with the tapered bottom surface of the annular groove and its inboard side surface slidably contacting with an axial end surface of the annular member.

BRIEF DESCRIPTION OF THE DRAWINGS

Other objects and advantages of the present invention will become apparent from the following description when taken in conjunction with the accompanying drawings, in which:

FIG. 2 is an enlarged view of the portion enclosed by a circle II shown in FIG. 1;

FIG. 2A is an enlarged view of the portion enclosed by a circle IIA shown in FIG. 2;

FIGS. 2B and 2C are views similar to FIG. 2A, but showing second and third embodiments of the present invention;

FIG. 3 is a view similar to FIG. 2, but showing a conventional technique for achieving the hub holding function;

FIG. 4 is an enlarged view of the portion enclosed by a circle IV shown in FIG. 1.

DETAILED DESCRIPTION OF THE INVENTION

Figure 1:
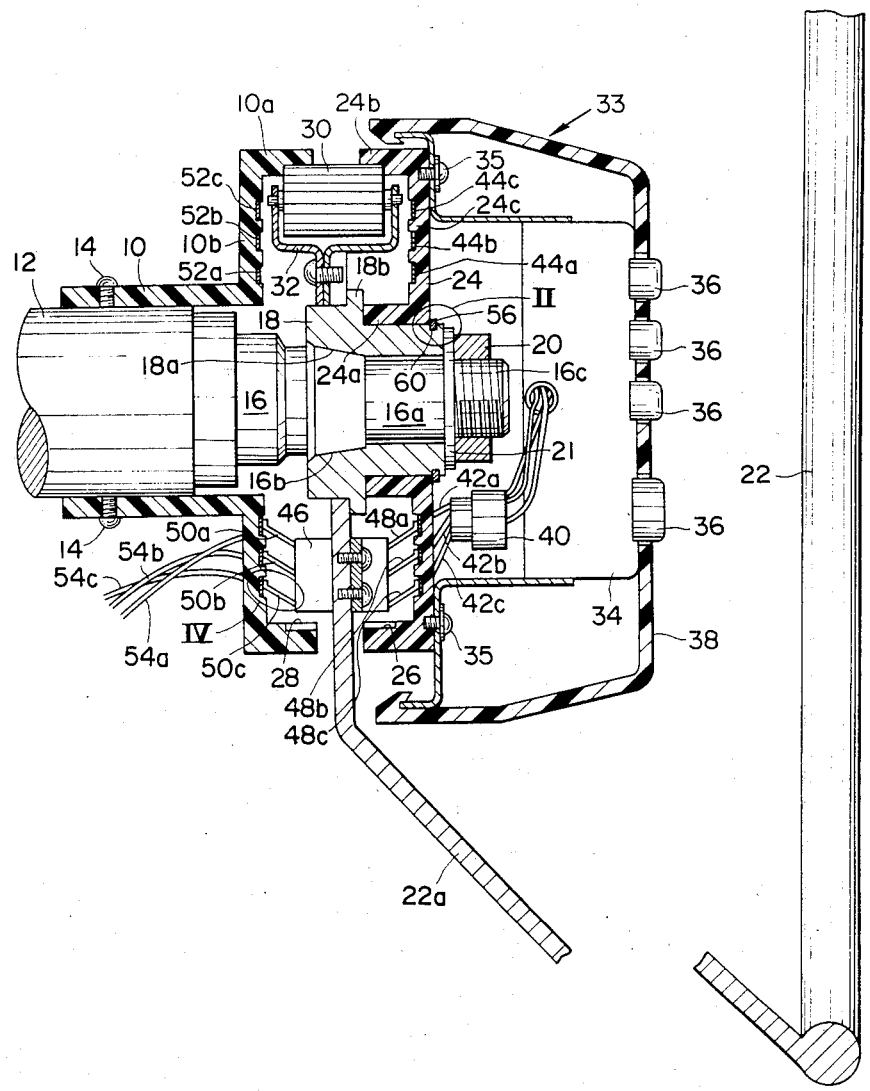
FIG. 1 is a sectional view of a steering wheel assembly with a non-rotatale center hub, to which a first embodiment of the present invention is practically applied.
Figure 5:
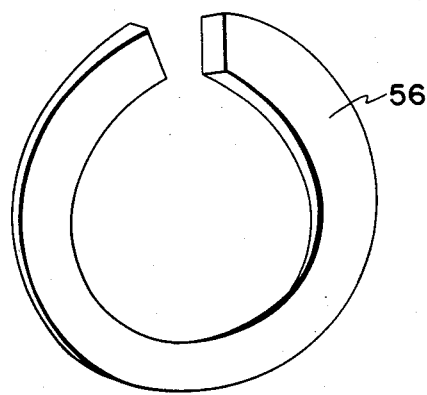
FIG. 5 is a schematic illustration of the snap ring embodied in the present invention.

Referring to FIG. 1 of the drawings, there is shown a steering wheel assembly with a non-rotatable center hub, according to the present invention. The assembly comprises a tubular member 10 of plastics coaxially disposed about an end of a steering column 12 and bolted thereto at 14. As shown, the tubular member 10 is enlarged at one end thereof to provide a larger diameter cylindrical portion 10a leaving therebetween an annular shoulder portion 10b. A steering shaft 16 is rotatably received in the steering column 12, having one axial end 16a projected from the column 12, as shown. Coaxially and securely disposed on the projected end 16a of the steering shaft 16 is a tubular holder 18 which is thus rotatable with the steering shaft 16. The projected end 16a and the tubular holder 18 have respectively a tapered shaft portion 16b and a tapered bore portion 18a which are firmly mated with each other upon proper connection therebetween. A nut 20 is screwed to the threaded end 16c of the steering shaft 16 to bias through a washer 21 the tubular holder 18 in the leftward direction in FIG. 1, so that the tubular holder 18 and the steering shaft 16 are secured at the mutually mated tapered portions. Spokes 22a of the steering wheel 22 are securely fixed to the tubular holder 18, so that the steering wheel 22 and the steering shaft 16 rotate together. The tubular holder 18 is formed with a cylindrical outer surface about which a hub portion 24a of an annular member 24 of plastics is concentrically and rotatably disposed. An annular step 18b is formed on the tubular holder 18 to restrict the leftward movement of the annular member 24. For holding the annular member 24 on the tubular holder 18 without permitting axial play thereof relative to the tubular holder 18, a unique measure is employed in the present invention as will be described in detail hereinafter.

The annular member 24 has a cylindrical outer portion 24b which extends toward the larger diameter cylindrical portion 10a of the tubular member 10. These cylindrical portion 24b and 10a are respectively formed with identical internal teeth 26 and 28.

Operatively meshed with the internal teeth 26 and 28 of the annular member 24 and the tubular member 10 is a pinion gear 30. The pinion gear 30 is rotatably supported by a holder 32 which is fixed to the tubular holder 18 in the illustrated known manner. Thus, during rotation of the steering wheel 22, the pinion gear 30 revolves about the axis of the steering shaft 16 while rotating about its axis keeping the meshing engagement with the internal teeth 26 and 28. It is to be noted that due to the identical construction of these teeth 26 and 28, the annular member 24 is kept stationary (or not rotated) even when the steering wheel 22 is rotated.

A non-rotatable center hub 33 is incorporated with the steering wheel assembly and acts as a switch mounting panel or instrument panel. The center hub 33 comprises a switch housing 34 bolted to the annular member 24 at 35. The housing 34 receives therein a plurality of known switches each having a button 36 or the like partially projected from the housing 34. A cup-shaped rigid cover 38 of plastics is removably fitted to the annular member 24 to cover the switch housing 34 except the switch buttons, as shown. Lead wires from the switches lead to an electric connector 40 from which another lead wires 42a, 42b and 42c extend.

Annular conductive plates 44a, 44b and 44c are concentrically disposed on the inboard surface of the major portion 24c of the annular member 24, which are respectively connected to the lead wires 42a, 42b and 42c. A slider holder 46 is bolted to one of the spokes 22a of the steering wheel 22, which has at its one side conductive sliders 48a, 48b and 48c the leading ends of which are in sliding contact with the fixed annular conductive plates 44a, 44b and 44c, respectively. The holder 46 has at its other side another conductive sliders 50a, 50b and 50c the leading ends of which are in sliding contact with another annular conductive plates 52a, 52b and 52c. These sliders 52a, 52b and 52c are respectively connected to the sliders 48a, 48b and 48c in a known manner in the holder 46. If desired, the mutually associated sliders, that is, 50a and 48a, 50b and 48b, or 50c and 48c may be constructed as monolithic structure. Similar to the case of the annular plates 44a, 44b and 44c, the other annular plates 52a, 52b and 52c are concentrically disposed on the inboard surface of the annular shoulder portion 10b of the tubular member 10. Lead wires 54a, 54b and 54c are respectively connected to the annular plates 52a, 52b and 52c and lead to known electric devices (not shown). For achieving smooth sliding movement of the sliders on the associated conductive annular plates, lubricating oil is applied to the surfaces of the annular plates. The detailed construction of each slider is understood from FIG. 4 which is an enlarged sectional view of the portion enclosed by a circle IV of FIG. 1. Each slider, for example 50c, is constructed of a bimetal composed of bonded first and second metals 51 and 53 which have higher and lower coefficients of thermal expansion respectively. This construction exhibits an advantageous effect in cold season at which the viscosity of the lubricating oil is increased to affect the electric contact between the sliders and the annular plates. That is, in such cold condition, the sliders tend to stand up (or, bend downward in FIG. 4) because of the nature of the bimetal used, thereby increasing the contact between the sliders and the associated annular plates assuring the electrical connection therebetween.

In the present invention, a unique measure is employed for assuredly holding the annular member 24 (that is, the non-rotatable center hub 33 carried by the member 24) on the tubular holder 18.

In order to clarify the unique measure of the present invention, one conventional measure for the same purpose will be outlined with reference to FIG. 3 which is disclosed in Japanese Utility Model Application No. 56-51160 now Publication No. 57-163448.

As is seen from FIG. 3, the conventional measure employs a snap ring 56 which is concentrically disposed in an annular groove 58 formed about the cylindrical outer surface of the tubular holder 18 at the portion near one axial end of the same. The snap ring 56 is so sized that upon proper assembly, it is coaxially disposed on the rounded bottom surface of the annular groove 58 with the inboard side surface thereof slidably contacting with the axial end surface of the hub portion 24a of the annular member 24. The annular groove 58 is so arranged that, upon proper assembly of the tubular holder 18 and the annular member 24, the axial end surface of the hub portion 24a is partially projected over the groove 58, as shown. By the nature of the snap spring 56, the snap ring 56 is attached to the rounded bottom of the groove with a considerable gripping force, so that the stopping effect of the ring 56 applied to the rotatable annular member 24 is fairly reliably achieved. However, in practical use, the snap ring 56 tends to be displaced axially outwardly from the desired stopping position due to the axially outward force applied thereto by the annular member 24 upon manipulation of the steering wheel 22. With the snap ring 56 thus displaced, the annular member 24 comes loose in axial direction and thus the center hub 33 secured thereto comes loose also thereby lowering the quality value thereof as has been mentioned hereinbefore. Theoretically, this undesired phenomenon can be solved if the width of the annular groove 58 is reduced to such a degree as corresponding to the thickness of the snap ring 56. However, from a practical point of view, a fairly wide groove 58 as shown is inevitably necessary because of unavoidable dimensional and manufacturing errors of the parts used. (Furthermore, widening the groove 58 facilitates the work for fitting the snap ring 56 to the groove 58). Thus, in the above-mentioned conventional measure, long time fast mounting of the non-rotatable center hub 33 is not expected.

Referring to FIGS. 2 and 2A, there is shown an improved measure according to the present invention which can solve the drawback encountered in the above-mentioned conventional measure. As is best seen from FIG. 2A, the rounded bottom of the annular groove 60 employed in this measure is tapered in the leftward direction, that is, toward the middle portion of the tubular holder 18, so that the groove 60 has a frustoconical bottom surface with its largest diameter at the axially outboard portion. The diameter of the middle portion 60a of the tapered annular groove 60 is substantially equal to the inner diameter of the snap ring 56 in its operative condition. Thus, upon proper fitting of the snap ring 56 to the groove shown by FIG. 2A, the rightward displacement of the ring 56 is not easily carried out because of the engagement of the outboard peripheral edge of the ring 56 with the tapered bottom surface of the groove 60. That is, the rightward displacement of the snap ring 56 causes the ring 56 to open producing a counterforce to stop the displacement. With this stopping function, the annular member 24 is stably held on the tubular holder 18, so that the non-rotatable center hub 33 is stably held in the steering wheel assembly without axial play thereof. If desired, the cylindrical inner wall of the snap ring 56 may be convexed. In this modification, substantially the same advantageous function is expected.

Referring to FIG. 2B, there is shown a modification of the above-mentioned measure. In this modification, the cylindrical inner wall of the snap ring 56' is tapered in the same direction as the tapered bottom surface of the annular groove 60. Preferably, the taper angle of the inner wall of the snap ring 56' is equal to that of the bottom surface of the groove 60. With this modification, the center hub holding function is much assured because of the considerable friction force generated between the mutually contacting tapered surfaces of the ring 56' and the groove 60.

Referring to FIG. 2C, there is shown another modification of the measure. In this modification, the tapered bottom surface of the annular groove 62 is convexed. The radius of curvature of the bottom surface is less at the shallow portion 62a than that at the deeper portion 62b, as shown. With this convex surface of the bottom of the groove 62, the increasing rate of the gripping force of the snap ring 56 is decreased as the ring 56 is displaced rightwardly. Thus, in this modification, the center hub holding function is much more accurately achieved. If desired, the tapered bottom surface of the groove may be concaved. In this case, the increasing rate of the gripping force of the snap ring is increased as the ring is displaced rightwardly.

As is understood from the above, since, in the present invention, the bottom surface of the annular groove is tapered in the above-described manner, the holding function of the snap ring applied to the annular member 24 (that is, the center hub 33 secured to the annular member 24) is assuredly effected.

What is claimed is:

1. A steering wheel assembly with a non-rotatable center hub, comprising:
   a steering shaft to which a steering wheel is connected to rotate therewith;
   a tubular holder coaxially disposed on said steering shaft and secured thereto to rotate therewith;
   an annular member concentrically disposed about said tubular holder and rotatable relative thereto, said annular member carrying thereon said non-rotatable center hub;
   first means for restricting the axial movement of said annular member in one direction relative to said tubular holder;
   second means for restricting the axial movement of said annular member in the other direction relative to said tubular holder; and
   third means for holding said annular member stationary relative to said tubular holder even when said steering shaft and thus said tubular holder are rotated,
   wherein one of said first and second means comprises an annular groove formed about said tubular holder, the rounded bottom surface of said annular groove being tapered toward the other of said first and second means, and a snap ring coaxially disposed in said annular groove with its inner wall contacting with the tapered bottom surface of said annular groove and its inboard side surface slidably contacting with an axial end surface of said annular member.

2. A steering wheel assembly as claimed in claim 1, in which said annular groove is so arranged that, upon proper assembly of said tubular holder and said annular member, the axial end surface of said annular member is partially projected over said groove.

3. A steering wheel assembly as claimed in claim 2, in which said snap ring is formed with a cylindrical inner wall surface, so that upon proper fitting of the snap ring to said groove, the outboard peripheral edge of said ring is in contact with the tapered bottom surface of said annular groove.

4. A steering wheel assembly as claimed in claim 2, in which said snap ring is formed with a tapered inner wall which is tapered in the same direction as the tapered bottom surface of said annular groove.

5. A steering wheel assembly as claimed in claim 4, in which the taper angle of said inner wall of the snap ring is equal to that of the tapered bottom surface of said annular groove.

6. A steering wheel assembly as claimed in claim 1, in which the other of said first and second means is an annular step formed on said tubular holder.

7. A steering wheel assembly with a non-rotatable center hub, comprising:
   a steering shaft to which a steering wheel is connected to rotate therewith;
   a tubular holder coaxially disposed on said steering shaft and secured thereto to rotate therewith;
   an annular member concentrically disposed about said tubular holder and rotatable relative thereto, said annular member carrying thereon said non-rotatable center hub;
   first means for restricting the axial movement of said annular member in one direction relative to said tubular holder;
   second means for restricting the axial movement of said annular member in the other direction relative to said tubular holder; and
   third means for holding said annular member stationary relative to said tubular holder even when said steering shaft and thus said tubular holder are rotated,
   wherein one of said first and second means comprises an annular groove formed about said tubular holder, the rounded bottom surface of said annular groove being tapered toward the other of said first and second means, and a snap ring coaxially disposed in said annular groove and being formed with a cylindrical inner wall surface, so that upon proper fitting of the snap ring to said groove, the outboard peripheral edge of said ring is in contact with the tapered bottom surface of said annular groove and the inboard side surface is in slidable contact with an axial end surface of said annular member, and wherein the tapered bottom surface of said annular groove is convex, with the radius of curvature of the bottom surface being less at the shallow portion than at the deeper portion.

* * * * *